(12) United States Patent
Teranishi (10) Patent No.: US 11,683,467 B2
(45) Date of Patent: Jun. 20, 2023

(54) LENS UNIT, STEREO CAMERA, AND MOBILE OBJECT

(71) Applicant: Ryoichi Teranishi, Kanagawa (JP)

(72) Inventor: Ryoichi Teranishi, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 17/670,530

(22) Filed: Feb. 14, 2022

(65) Prior Publication Data

US 2022/0295037 A1    Sep. 15, 2022

(30) Foreign Application Priority Data

Mar. 12, 2021  (JP) .............................. JP2021-040804

(51) Int. Cl.
| | | |
|---|---|---|
| *H04N 13/239* | (2018.01) | |
| *H04N 13/00* | (2018.01) | |
| *G02B 1/04* | (2006.01) | |
| *G02B 7/02* | (2021.01) | |

(52) U.S. Cl.
CPC ........... *H04N 13/239* (2018.05); *G02B 1/041* (2013.01); *G02B 7/026* (2013.01); *H04N 2013/0081* (2013.01)

(58) Field of Classification Search
CPC ......... H04N 13/239; H04N 2013/0081; G02B 1/041; G02B 7/026; G02B 7/022; G02B 2003/0093; G02B 7/028; G03B 35/08
USPC ............................................................ 348/47
See application file for complete search history.

(56) References Cited

U.S. PATENT DOCUMENTS

| | | | |
|---|---|---|---|
| 2003/0016454 A1* | 1/2003 | Yamaguchi | G02B 13/002 359/819 |
| 2004/0223074 A1 | 11/2004 | Takada | |
| 2011/0085070 A1* | 4/2011 | Kang | G02B 7/022 348/340 |
| 2012/0262805 A1 | 10/2012 | Fujii et al. | |
| 2016/0091690 A1 | 3/2016 | Nakajima | |

(Continued)

FOREIGN PATENT DOCUMENTS

| | | |
|---|---|---|
| EP | 1 258 764 A2 | 11/2002 |
| EP | 3 444 669 A1 | 2/2019 |

(Continued)

OTHER PUBLICATIONS

Extended European Search Report dated Jul. 19, 2022 in European Patent Application No. 22154204.6, 8 pages.

*Primary Examiner* — Susan E. Torgerson
(74) *Attorney, Agent, or Firm* — Xsensus LLP (57) ABSTRACT

A lens unit includes: a resin lens including a flange forming an outer peripheral portion of the resin lens and a fitting portion having a diameter smaller than a diameter of the outer peripheral portion of the flange; a lens barrel including a lens housing chamber and an abutting surface, the lens housing chamber housing the resin lens with the fitting portion facing the abutting surface; and a pressing member pressing the resin lens against the abutting surface along an optical axis of the resin lens. The fitting portion being fit into the lens housing chamber over an entire circumference of the fitting portion with clearance between the entire circumference and the lens housing chamber to position the resin lens in a direction perpendicular to the optical axis of the resin lens.

10 Claims, 8 Drawing Sheets

(56) References Cited

U.S. PATENT DOCUMENTS

| | | | |
|---|---|---|---|
| 2018/0343439 A1* | 11/2018 | Furutake | H04N 13/239 |
| 2021/0011249 A1 | 1/2021 | Yokoyama | |
| 2021/0165184 A1* | 6/2021 | Endo | G03B 30/00 |
| 2021/0271054 A1 | 9/2021 | Yokoyama | |

FOREIGN PATENT DOCUMENTS

| | | |
|---|---|---|
| JP | 2002-341218 | 11/2002 |
| JP | 2007-212744 | 8/2007 |
| JP | 2021-026223 | 2/2021 |
| WO | 2021/005991 A1 | 1/2021 |

* cited by examiner

FIG. 5A
COMPARATIVE EXAMPLE

FIG. 5B
COMPARATIVE EXAMPLE

FIG. 6A
COMPARATIVE EXAMPLE

FIG. 6B
COMPARATIVE EXAMPLE

COMPARATIVE EXAMPLE

FIG. 9

LENS UNIT, STEREO CAMERA, AND MOBILE OBJECT

CROSS-REFERENCE TO RELATED APPLICATIONS

This patent application is based on and claims priority pursuant to 35 U.S.C. § 119(a) to Japanese Patent Application No. 2021-040804, filed on Mar. 12, 2021, in the Japan Patent Office, the entire disclosure of which is incorporated by reference herein.

BACKGROUND

Technical Field

The present disclosure relates to a lens unit, a stereo camera, and a mobile object.

Related. Art

In a lens unit for use in an in-vehicle sensing camera, an inexpensive resin lens has been replacing a glass lens to reduce costs. A typical lens unit includes lenses in a lens housing chamber that is a cylindrical hollow portion of a lens barrel. The lenses are held in the lens housing chamber by using pressing force, press-fit, or bonding with a spring or a screw.

The outer periphery of the glass lens usually has a cylindrical shape. Manufacturing the resin lens involves forming a gate to allow injection of a molten resin material into a mold. In forming the gate, a cut mark remains on the outer periphery of the resin lens due to cutting off of the gate. Because of this cut mark, the resin lens is not cylindrically shaped.

Specifically, an edge of the outer peripheral portion of the lens is cut in a D-shape, and a gate is formed on a surface of the D-shaped portion to avoid interference between the gate of the resin lens and the lens housing chamber of the lens barrel. This configuration prevents the gate from protruding from the outer periphery of the resin lens. In another example configuration, a convex gate remains on a cylindrical surface of the resin lens, whereas the lens housing chamber of the lens barrel is partly shaped to form a concave portion, or a recess to accommodate the convex gate. This configuration allows the recess of the lens barrel to accommodate the gate of the resin lens.

SUMMARY

In view of such circumstances, the present disclosure aims at reducing the degree of misalignment between the axes of a lens barrel and a resin lens in a lens unit.

A lens unit includes a resin lens; a lens barrel including a lens housing chamber and an abutting surface, the lens housing chamber housing the resin lens; and a pressing member pressing the resin lens against the abutting surface along an optical axis of the resin lens. The resin lens includes a flange firming an outer peripheral portion of the resin lens and a fitting portion having a diameter smaller than a diameter of the outer peripheral portion of the flange, the fitting portion facing the abutting surface. The fitting portion is fit into the lens housing chamber over an entire circumference of the fitting portion with clearance between the entire circumference and the lens housing chamber to position the resin lens in a direction perpendicular to the optical axis of the resin lens.

A stereo camera includes two lens units whose optical axes are parallel to each other; and two image sensors to convert light received by the two lens units into image data.

A mobile object includes the stereo camera and circuitry to: receive image data from the stereo camera; calculate disparity from the image; and based on the disparity, control an operation of the mobile object.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION in describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise.

Embodiments of the present disclosure reduce the degree of misalignment between the axes of a lens barrel and a resin lens lit to each other with clearance therebetween in a lens unit during assembly of the lens unit and with temperature change.

A lens unit, a stereo camera, and a mobile object according to an embodiment of the present disclosure are described below in detail with reference to the accompanying drawings.

The present embodiment relates to a lens unit, such as an in-vehicle stereo camera, whose decentering of lens is to be controlled with high accuracy. The present embodiment is applicable to positioning of a resin lens to be fit into the lens barrel with clearance therebetween, in a direction perpendicular to the optical axis.

Figure 1:
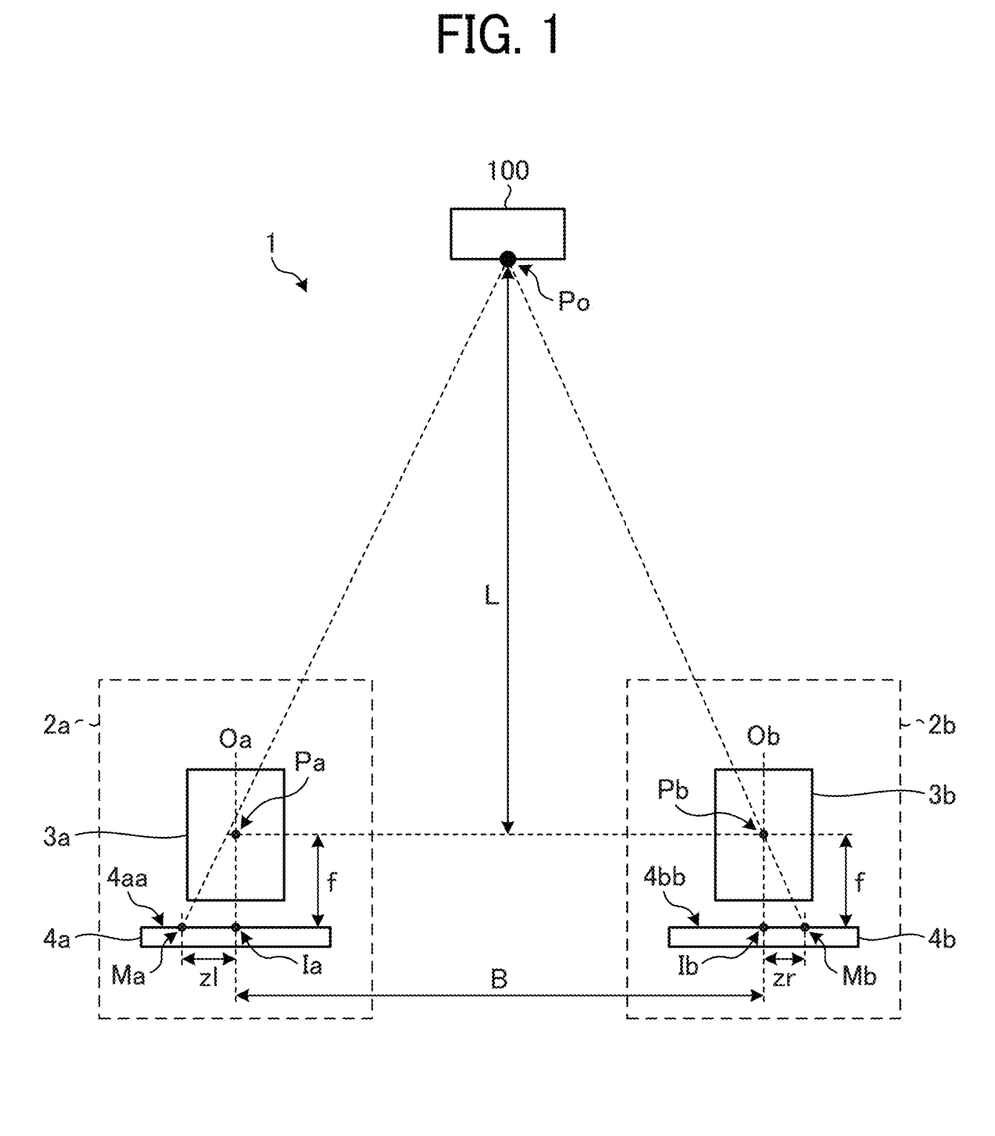
FIG. 1 is an illustration of the principle for obtaining a distance between a stereo camera according to an embodiment and an object.

FIG. 1 is an illustration of the principle for deriving a distance between a stereo camera 1 according to an embodiment and an object 100, The following describes the principle for deriving distance between the stereo camera 1 and the object 100 based on disparity between the stereo camera 1 and the object 100.

The stereo camera 1 illustrated in FIG. 1 includes a camera module 2a and a camera module 2b, whose optical axes are parallel to each other and whose imaging planes are at the same height. The camera modules 2a includes a lens unit 3a and an image sensor 4a (a solid-state image sensor). The lens unit 3a refracts incident light and forms an image of the object 100 onto the image sensor 4a. The camera module 2b includes a lens unit 3b and an image sensor 4b (a solid-state image sensor). The lens unit 3b refracts incident light and forms an image of the object 100 onto the image sensor 4b. The optical axes of the lens units 3a and 3b are perpendicular to the imaging planes 4aa and 4bb of the image sensors 4a and 4b, respectively. In other words, the optical axes of the lens units 3a and 3b are parallel to each other.

In FIG. 1, a point Po on the object 100 in the three-dimensional space is mapped onto a straight line on the image sensor 4a and the image sensor 4b parallel to a straight line connecting the lens unit 3a and the lens unit 3b. Disparity z is given by the sum of zr and zl (z=zr+zl) where zl is a distance between a point Ma at which light from the point Po on the object 100 forms an image on the imaging plane 4aa of the image sensor 4a and an intersection Ia between the imaging plane 4aa of the image sensor 4a and the optical axis Oa of the lens units 3a, and zr is a distance between a point Mb at which light from the point Po on the object 100 forms an image on the imaging plane 4bb of the image sensor 4b and an intersection Ib between the imaging plane 4bb of the image sensor 4b and the optical axis Ob of the lens units 3b.

Next, the distance L between the stereo camera 1 and the object 100 is derived by using the disparity z. The distance L is between a straight line connecting the principal point Pa of the lens unit 3a and the principal point Pb of the lens unit 3b and the point Po on the object 100. As illustrated in FIG. 1, distance L is given by formula (1) below where f is focal length of each of the lens unit 3a and the lens unit 3b, B is the reference length, or a length between the principal point Pa of the lens unit 3a and the principal point Pb of the lens unit 3b, and z is disparity between the camera modules 2a and 2b.

$$L=(B\times f)/(zr+zl)=(B\times f)/z \qquad (1)$$

Since the reference length B and the focal length f are obtained in advance, the distance L to the object 100 is calculated by merely detecting the disparity z. It can be seen from formula (1) above that the distance L decreases as the disparity z increases, and the distance L increases as the disparity z decreases.

Figure 2A:
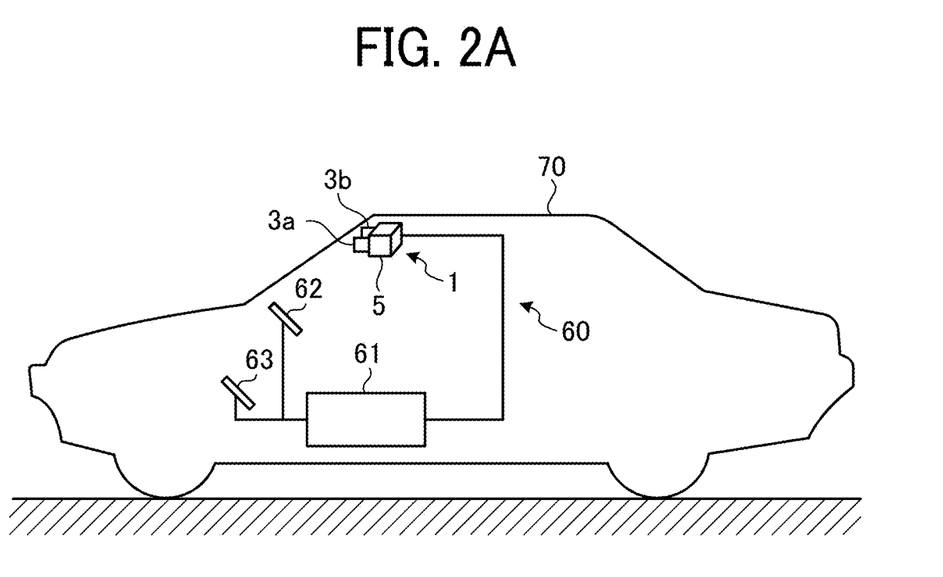
FIGS. 2A and 2B are illustrations of examples in which the stereo camera in FIG. 1 is mounted on a vehicle.
Figure 2B:
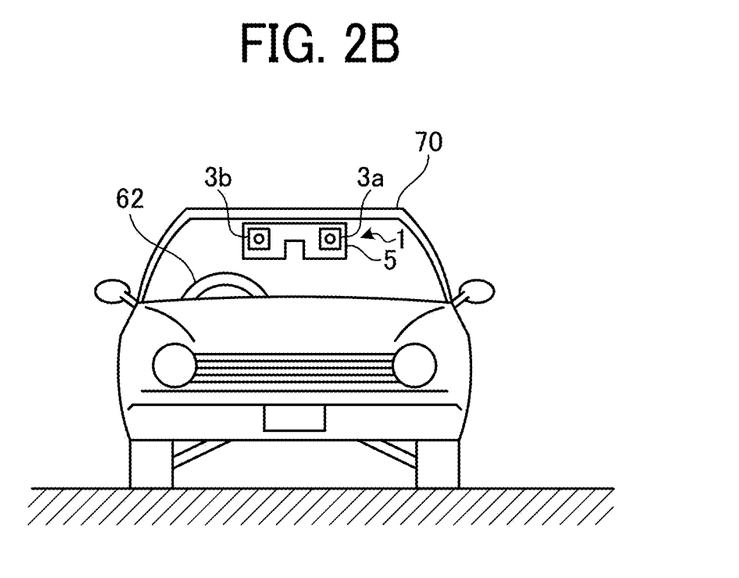

FIGS. 2A and 2B are illustrations of examples in which the stereo camera 1 in FIG. 1 is mounted on a vehicle 70.

The following describes the vehicle 70 mounted with the stereo camera 1 with reference to FIGS. 2A and 2B. FIG. 2A is a side view of the vehicle 70 mounted with the stereo camera 1. FIG. 2B is a front view of the vehicle 70.

As illustrated in FIGS. 2A and 2B, the vehicle 70, which is an example of a mobile object, is equipped with a vehicle control system 60. The vehicle control system 60 includes a stereo camera 1 mounted in the interior (inside space) of the vehicle 70, a vehicle controller 61, a steering wheel 62, and a brake pedal 63.

The stereo camera 1 serves to capture an image of a view in a traveling direction of the vehicle 70. The stereo camera 1 is mounted near a rearview mirror inside the windshield of the vehicle 70, for example. The stereo camera 1 includes a housing 5 and camera modules 2a and 2b fixed to the housing 5, which will be described later in detail. The camera modules 2a and 2b are fixed to the housing 5 so as to enable capturing of an image of an object in the traveling direction of the vehicle 70.

The camera modules 2a and 2b constitute a pair of cylindrical cameras, whose optical axes are parallel to each other and imaging planes are at the same height on the housing 5. For convenience of description, the camera module 2a is referred to as a left camera, and the camera module 2h is referred to as a right camera.

The vehicle controller 61 serves as a controller, or an electronic control unit (ECU) to control various parts of the vehicle 70 using image data received from the stereo camera 1. For example, the vehicle controller 61 controls a steering system including the steering wheel 62 to avoid an obstacle, or controls the brake pedal 63 to reduce speed and stop the vehicle 70 based on the image data received from the stereo camera 1.

The vehicle control system 60 improves the driving safety of the vehicle 70 by executing vehicle control such as steering control or brake control using the stereo camera 1 and the vehicle controller 61.

As described above, the stereo camera 1 captures an image of a view ahead of the vehicle 70. However, no limitation is intended thereby. In other words, the stereo camera 1 may be mounted so as to capture an image of a view behind or in a sideways direction of the vehicle 70. In such a configuration, the stereo camera 1 detects the position of a following vehicle in a rear direction of the vehicle 70 or the position of another vehicle travelling beside the vehicle 70 in parallel. Then, the vehicle controller 61 performs the above vehicle control upon detecting danger when, for example, the traffic lane in which the vehicle 70 is travelling is to be changed or two lanes of traffic are about to join into one. Moreover, for example, when it is determined that the risk of collision is present in a reversing operation to park the vehicle 70 based on the recognition information on an obstacle behind the vehicle 70, detected by the stereo camera 1, the vehicle controller 61 performs the above vehicle control.

Figure 3:
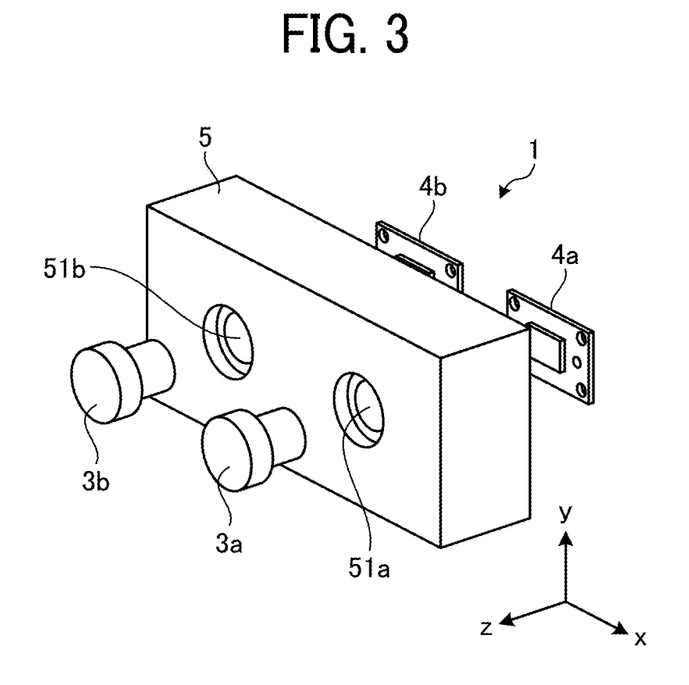
FIG. 3 is an exploded perspective view of the stereo camera.

FIG. 3 is an exploded perspective view of the stereo camera 1. The following describes the structure of the stereo camera 1 according to an embodiment with reference to FIG. 3. As illustrated in FIG. 3, it is assumed that the lens units 3a and 3b are placed in an XYZ coordinate system in which X-axis is along a line passing through the centers of the lens units 3a and 3b, and Z-axis is along the optical axis of the lens units 3a and 3h.

As illustrated in FIG. 3, the stereo camera 1 includes lens units 3a and 3b (optical systems), image sensors 4a and 4b, and a housing 5.

The lens units 3a and 3b are cylindrical lenses that form images with incident light onto the image sensors 4a and 4b, respectively. Each of the lens units 3a and 3b has a step on a side surface at a predetermined position along the optical axis. In each of the lens units 3a and 3b, an outer shape of a portion ranging from the predetermined position to the edge adjacent to an opening of the housing 5 is smaller than an outer shape of the other portion.

The housing 5 is a rectangular parallelepiped metallic member that constitutes a main body portion of the stereo camera 1 to secure the lens units 3a and 3b and the imagers sensors 4a and 4b. The housing 5 includes through-holes 51a and 51 penetrating from the front surface to the opposite surface.

The lens unit 3a is fit into the through-hole 51a through the opening of the through-hole Ma on the front surface of the housing 5. In this case, the outer diameters of the lens units 3a and the inner diameters of the through-holes 51a are substantially the same. Similarly, the lens unit 3b is fit into the through-hole 51b through the opening of the through-hole 51b on the front surface of the housing 5. In this case, the outer diameters of the lens units 3b and the inner diameters of the through-holes 51b are substantially the same.

With the lens units 3a and 3b fitted to the through-holes 51a and 51b, respectively, the optical axes of the lens units 3a and 3b coincide with the central axes of the through-holes 51a and 51b, respectively. Examples of method for fixing the lens units 3a and 3b to the housing 5 include: injecting an adhesive between the through-holes 51a and 51b and the lens units 3a and 3b to fix them; and forming screws on the side surfaces of the lens units 3a and 3b and screwing the lens units 3a and 3b into the through-holes 51a and 51b.

Figure 4:
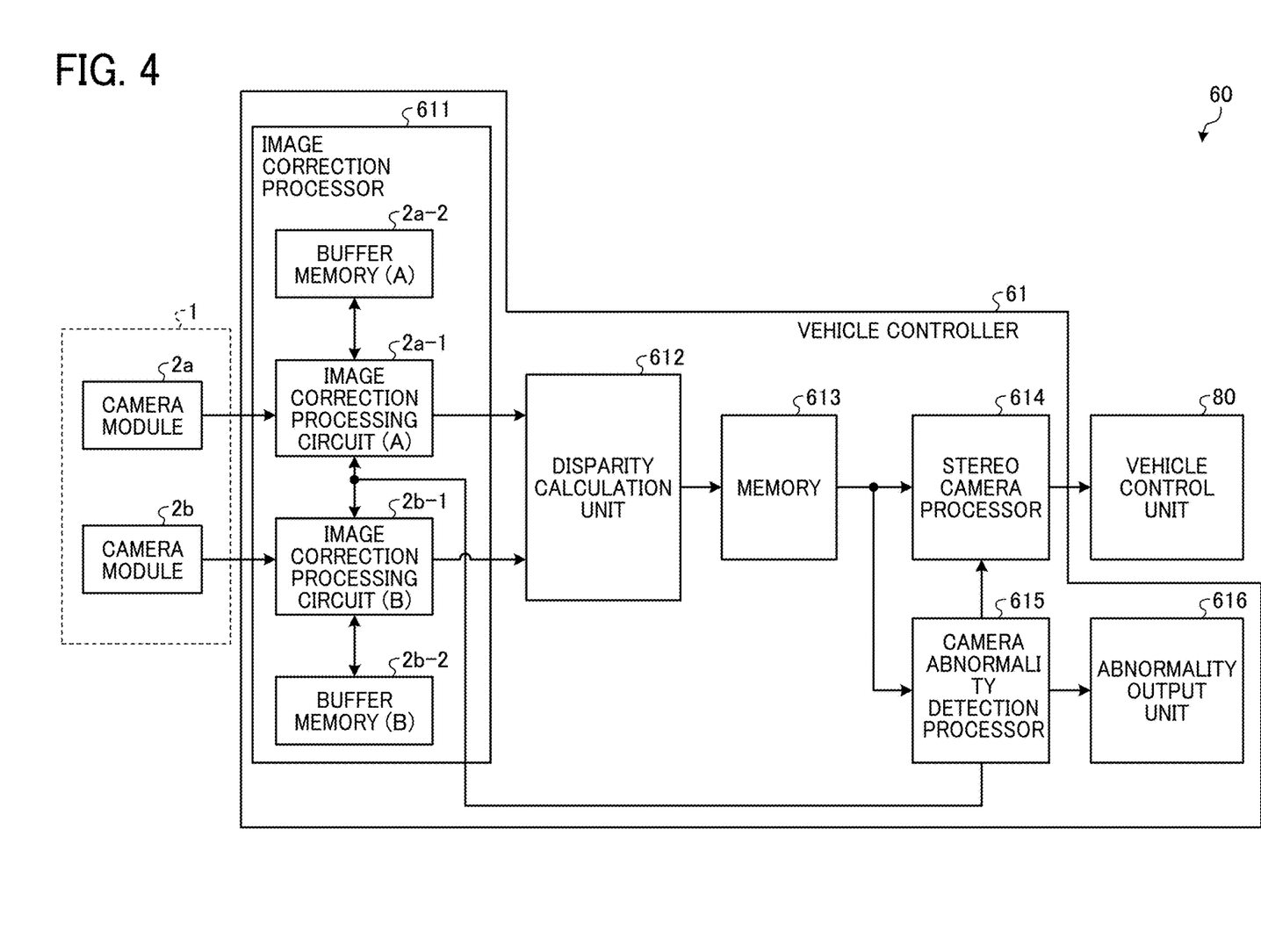
FIG. 4 is a block diagram of functional configuration of a vehicle control system including the stereo camera in FIG. 1.

FIG. 4 is a block diagram of functional configuration of a vehicle control system 60 including the stereo camera in FIG. 1, In FIG. 4, the vehicle controller 61 includes an image correction processor 611, a disparity calculation unit 612, a memory 613, a stereo camera processor 614, a camera abnormality detection processor 615, and an abnormality output unit 616. Note that the vehicle controller 61 further includes an operation input unit. The vehicle control unit 80 is a generic term for an automatic transmission control unit, a brake control unit, and a steering control unit of the vehicle 70 such as an automobile.

Each unit in FIG. 4 except for the stereo camera 1 and the vehicle control unit 80 is typically configured by a computer device. Specifically, each of the image correction processor 611, the disparity calculation unit 612, the stereo camera processor 614, and the camera abnormality detection processor 615 is implemented by a central processing unit (CPU) according to a program.

The memory 613 is a general term for a read only memory (ROM) and a random access memory (RAM). The memory 613 stores programs to be executed by the CPU, parameters and tables for processing by the CPU, data during processing or data acquired from processing by the CPU.

The abnormality output unit 616 is, for example, a display device, an audio output device, or an alarm lamp. The abnormality output unit 616 notifies a user of an abnormality of the stereo camera 1.

The camera modules 2a and 2b are arranged to have their optical axes parallel to each other and a predetermined interval (i.e., the reference length) between the camera modules 2a and 2b. The camera modules 2a and 2b operate in synchronization with each other to capture images of an object from different viewpoints. The camera modules 2a and 2b convert captured optical images into analog electric signals and further into digital signals to output image data. The image data is composed of 8 bits per pixel, for example, and has 0 to 255 gradations (luminance values).

The image correction processor 611 includes an image correction processing circuit (B) 2b-1 and a buffer memory (B) 2b-2 for an image of the camera module 2b as the right camera, and an image correction processing circuit (A) 2a-1 and a buffer memory (A) 2a-2 for an image of the camera module 2a as the left camera. Each of the buffer memory (B) 2b-2 and the buffer memory (A) 2a-2 is a line buffer having about ten to several tens of lines.

The stereo image data output from the camera module 2b as the right camera is stored in the buffer memory (B) 2b-2, and the stereo image data output from the camera module 2a as the left camera is stored in the buffer memory (A) 2a-2. The image correction processing circuit (A) 2a-1 and the image correction processing circuit (B) 2b-1 correct distortion remaining after camera assembly and misalignment between the camera module 2a and the camera module 2b in the image data stored in the buffer memory (A) 2a-2 and the buffer memory (B) 2b-2. The correction parameter is provided from the camera abnormality detection processor 615, which will be described later.

The image correction processor 611 according to an embodiment corrects misalignment between the camera modules 2a and 2h on a comparison image. The image correction processor 611 does not correct misalignment between the camera modules 2a and 2b on the reference image. For example, assuming that an image captured by the camera module 2b as the right camera is a reference image and an image captured by the camera module 2a as the left camera is a comparison image, the image correction processing circuit (A) 2a-1 corrects distortion remaining after camera assembly and misalignment between the camera modules 2a and 2b in the image data stored in the buffer memory (A) 2a-2. The image correction processing circuit (B) 2b-1 correct only distortion remaining after camera assembly in the image data stored in the buffer memory (B) 2b-2. The correction involves transforming coordinates (e.g., affine transformation) of the image data in the buffer memory (A) 2a-2 and the buffer memory (B) 2b-2 and outputting the transformed image data.

For color image data output from the camera module 2h as the right camera and the camera module 2a as the left camera, the image correction processing circuits (A) 2a-1 and (B) 2b-1 transform the color image data into monochrome image data (brightness image data) before the other processes for correction.

The disparity calculation unit 612 receives, from the image correction processor 611, two image datasets (stereo image datasets) in which distortion and misalignment between the camera module 2h as the right camera and the camera module 2a as the left camera are corrected, and calculates a disparity for each minute region to generate a disparity image dataset. The calculation of disparity uses the block matching.

For the two image datasets of the camera module 2a as the right camera and the camera module 2b as the left camera, a minute region a is cut out of the image data (brightness image) of the camera module 2a, and a minute region b is cut out of the image data (brightness image) of the camera module 2b. With reference to the position of the minute region a, the position of the minute region b is moved within a predetermined range to find a corresponding position so as to find a region corresponding to the minute region a. A difference between a reference position and a found position corresponding to the reference position is a disparity. Two image datasets of the camera modules 2a and 2b repeatedly undergo the block matching to obtain a disparity for each minute region in the entire stereo data of the camera modules 2a and 2b, and thus obtain a disparity image data.

The memory 613 stores the disparity image data calculated by the disparity calculation unit 612 and the image datasets (brightness image datasets) of the camera modules 2a and 2b.

The stereo camera processor 614 reads image data (brightness image data) and disparity image data of each of the camera modules 2a and 2b from the memory 613 to perform a process of recognizing an image of an obstacle and a process of calculating distance to the obstacle. These processes are referred to as stereo camera processing.

The vehicle control unit 80 controls, for example, traveling of the vehicle 70 in accordance with the processing result of the stereo camera processor 614. The vehicle control unit 80 controls, for example, automatic transmission and a brake pedal 63 to maintain the inter-vehicle distance, and a steering wheel 62 to avoid a collision.

The camera abnormality detection processor 615 reads image data of each of the camera modules 2a and 2b from the memory 613 to detect misalignment between the camera modules 2a and 2b (i.e., the stereo camera 1). If the misalignment between the camera modules 2a and 2b are within the range of the buffer memories (the buffer memory (A) 2a-2 and the buffer memory (B) 2b-2), the camera abnormality detection processor 615 generates a correction parameter based on the misalignment, and transmits the generated correction parameter to the image correction processing circuit (A) 2a-1 and the image correction processing circuit (B) 2b-1. Further, the camera abnormality detection processor 615 holds the generated correction parameter. If the misalignment between the camera modules 2a and 2b are out of the range of the buffer memories (the buffer memory (A) 2a-2 and the buffer memory (B) 2b-2), the camera abnormality detection processor 615 determines that the camera modules 2a and 2b (the stereo camera 1) are abnormal, and notifies the stereo camera processor 614 and the abnormality output unit 616 of abnormality of camera (stereo camera abnormality).

In response to being notified of abnormality of camera by the camera abnormality detection processor 615, the stereo camera processor 614 temporarily interrupts the stereo camera processing. As a result, the control operation of the vehicle control unit 80 is also temporarily suspended. In response to being notified of abnormality of camera by the camera abnormality detection processor 615, the abnormality output unit 616 notifies the user of the camera abnormality. Specifically, the abnormality output unit 616 displays a camera abnormality or notifies the user of the camera abnormality using sound or a buzzer. This allows the user (the driver) to recognize that the vehicle control unit 80 is malfunctioning. The lens units 3a and 3b constituting the stereo camera 1 use resin lenses, Such a resin lens might change a degree of decentering of lens with temperature or external force. Such a change in the degree of decentering of lens changes the position at which an image of the object is formed, and further changes the disparity z. The change in the degree of decentering of lens causes a deterioration in range-finding accuracy because a measured value of the stereo camera 1 is derived from the disparity value z using the formula (1) described above. The relation between the disparity and the degree of decentering of lens varies with the optical system of lens, which is to be adjusted in μm units.

For an in-vehicle application in the vehicle 70 which is an automobile, since a use temperature range is wide, an adverse effect of a change in a degree of decentering of lens due to a temperature is large. Specifically, in the case of an in-vehicle application, use in an environment of about −40° C. to 105° C. is assumed. In view of such a situation, the degree of decentering of lens is not to be changed with temperature.

FIGS. 5A, 5B, 6A, and 6B are illustrations of configurations of a lens unit according to a comparative example. In the lens units of FIGS. 5A, 5B, 6A, and 6B, a resin lens 300 is fit with clearance into a lens barrel 310 to be roughly positioned in the lens barrel 310. This will be described in detail below.

As illustrated in FIGS. 5A, 5B, 6A, and 6B, the resin lens 300 has an optically effective range 301 and includes a flange 302 outside the optically effective range 301. The flange 302 includes a gate 304 at an edge of the outer peripheral portion of the flange 302, which is used to flow a molten resin material into a mold during molding of a resin lens.

Figure 5A:
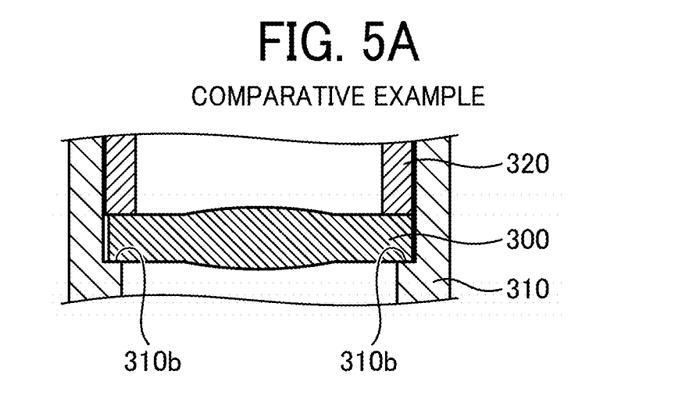
FIGS. 5A and 5B are illustrations of the configuration of a lens unit according to a comparative example.
Figure 5B:
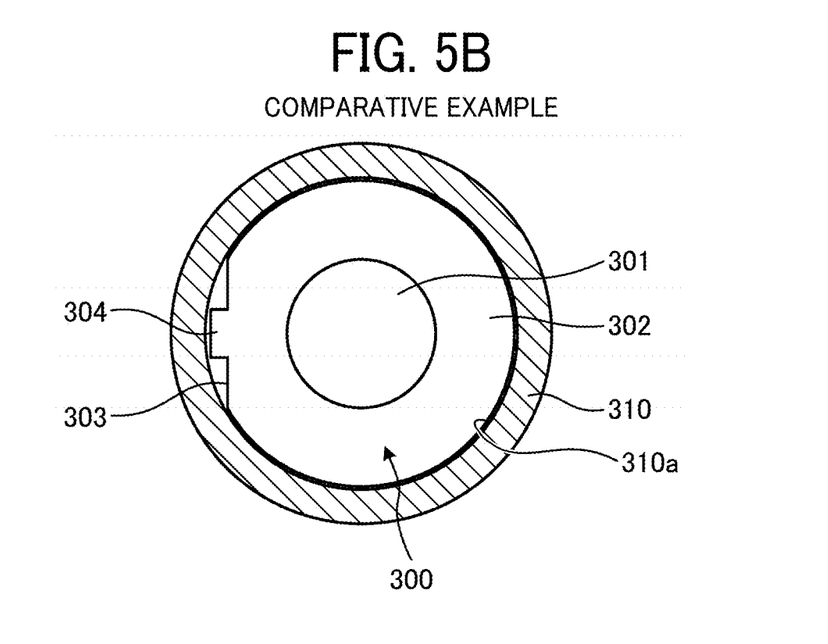

The gate 304 and the inner wall of the lens barrel 310 are not to interfere with each other during assembly of the lens barrel 310 and the resin lens 300. To avoid such an interference, the gate 304 is provided in the outer peripheral surface of the resin lens 300 as illustrated in FIGS. 5A and 5B, or a concave recess 311 is provided in the lens barrel 310 to accommodate the gate 304 as illustrated in FIGS. 6A and 6B.

The resin lens 300 in FIGS. 5A and 5B has an edge of the peripheral portion (the outer circumferential portion) cut in a D-shape (hereinafter, referred to as a D-shaped cut) to form a flat portion 303, on which the gate 304 is provided. This D-shaped cut prevents the gate 304 from protruding beyond the extended line of the outer circumference of the flange 302.

The lens barrel 310 includes a substantially cylindrical lens housing chamber 310a. The resin lens 300 is inserted into the lens housing chamber 310a until the resin lens 300 abuts against the abutting surface 310b of the lens barrel 310. At this time, the cylindrical surface of the resin lens 300 except the area (or the periphery) of the flat portion 303 of the resin lens 300 is fit into the lens housing chamber 310a of the lens barrel 310 to position the resin lens 300 along the direction perpendicular to the optical axis.

Figure 6A:
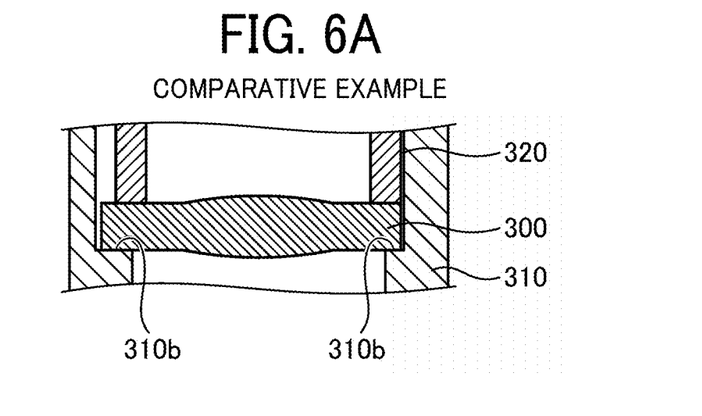
FIGS. 6A and 6B are illustrations of the configuration of a lens unit according to another comparative example.
Figure 6B:
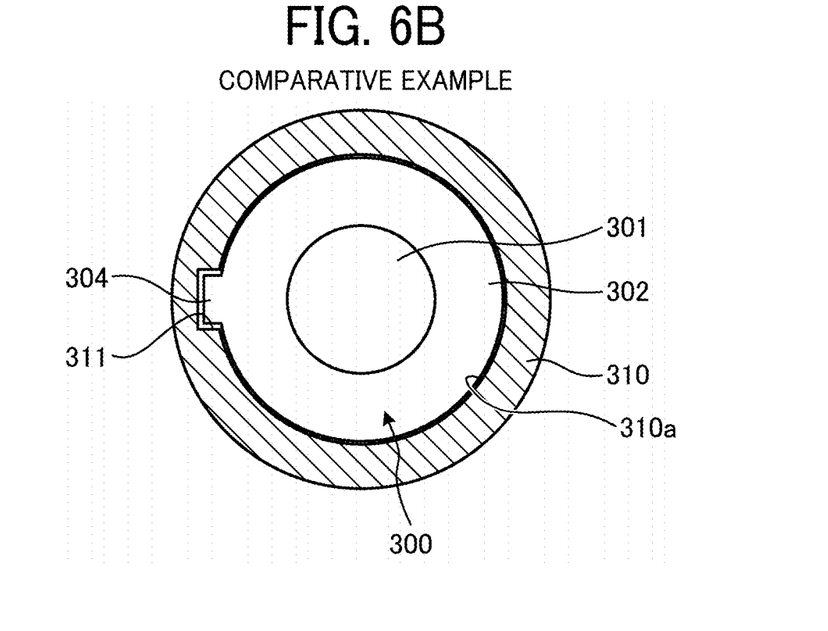

In FIGS. 6A and 6B, the gate 304 of the resin lens 300 is a convex portion protruding from the outer circumference of the resin lens 300. The gate 304 is fit into a concave recess 311 of the lens barrel 310, which serves to accommodate the gate 304 to avoid the interference between the gate 304 and the lens barrel 310. During assembly of the lens unit, the resin lens 300 is inserted into the lens housing chamber 310a until the resin lens 300 abuts against the abutting surface 310h of the lens barrel 310 similarly to the above. At this time, the resin lens 300 is radially fit into a region other than the area of the recess 311 of the lens barrel 310 so as to be positioned in the direction perpendicular to the optical axis.

In any of FIGS. 5A, 5B, 6A, and 6B, the outer circumference of the resin lens 300 and the inner wall of the lens barrel 310 are assembled with a desired fitting clearance therebetween, and the resin lens 300 is fixed to the lens barrel 310 by receiving a pressing force from a pressing member 320.

This configuration in which the outer circumference of the resin lens 300 is fit into the inner wall of the lens barrel 310 with fitting clearance therebetween might cause an increase in the degree of misalignment between the axes of the resin lens 300 and the lens housing chamber 310a of the lens barrel 310 if the resin lens 300 is deformed during the initial assembly of the lens unit or with a temperature change.

Next, the configuration of the lens units 3a and 3b according to an embodiment will be described in detail.

Figure 7A:
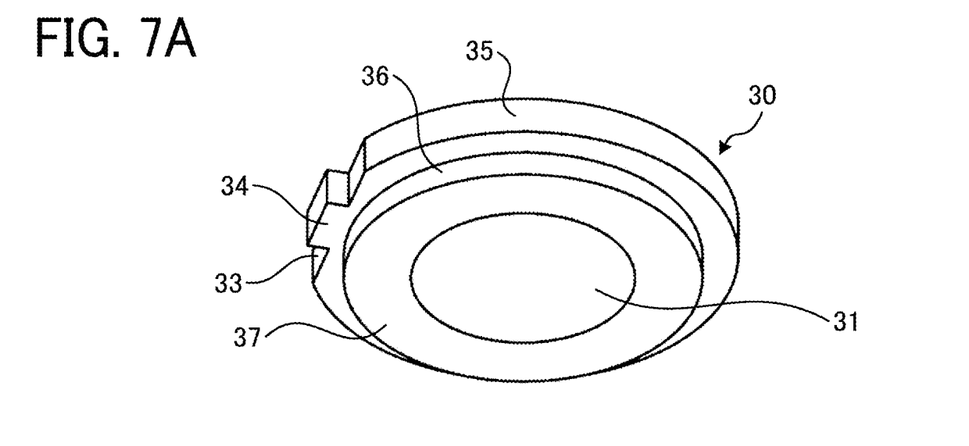
FIGS. 7A, 7B, and 7C are illustrations of a configuration of a lens unit according to an embodiment.
Figure 7B:
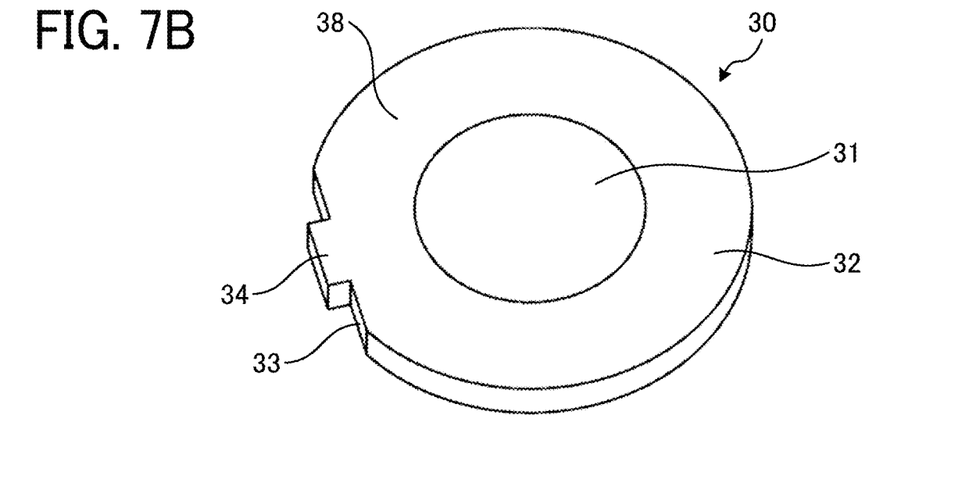
Figure 7C:
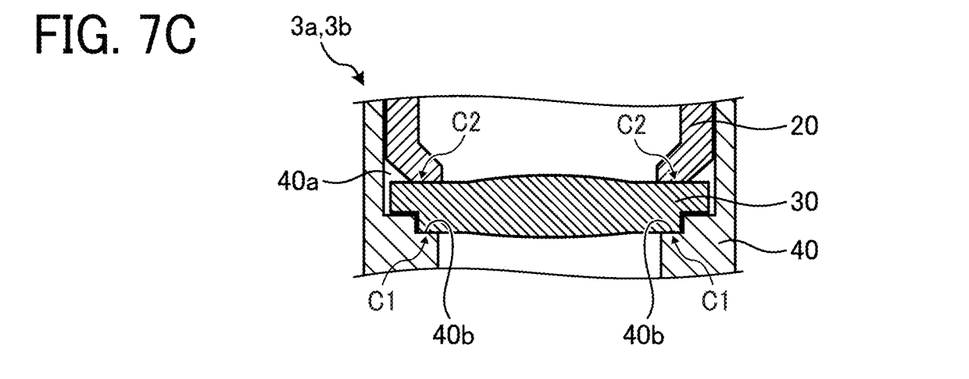

FIGS. 7A, 7B, and 7C are illustrations of a configuration of the lens units 3a and 3b according to an embodiment. FIG. 7A is a perspective view of the resin lens 30 as viewed from below. FIG. 7B is a perspective view of the resin lens 30 as viewed from above. FIG. 7C is a cross-sectional view of the lens units 3a and 3b in which the resin lens 30 is incorporated in the lens barrel 40.

As illustrated in FIGS. 7A, 7B, and 7C, the lens units 3a and 3b each include the resin lens 30, the lens barrel 40, and the pressing member 20.

The resin lens 30 has an optically effective range 31 and includes a flange 32 outside the optically effective range 31. The flange 32 forms a peripheral portion of the resin lens 30. The resin lens 30 is radially fit into the lens barrel 40 so as to be positioned in the direction perpendicular to the optical axis. The resin lens 30 is fixed to the lens barrel 40 by receiving a pressing force from the pressing member 20.

In FIGS. 7A, 7B, and 7C, the resin lens 30 has an edge of the outer peripheral portion (a part of the outer circumference) of the flange 32 cut in a D-shape (hereinafter, sometimes referred to as a D-shaped cut) to form a flat portion 33, on which a gate 34 is to be provided to flow molten resin material into a mold during molding of lens. The gate 34 is shaped not to protrude beyond the extended line of the outer circumference of the flange 32.

Further, the resin lens 30 further incudes a fitting portion 36 having a smaller diameter than that of the flange 32 below the flange 32 (i.e., the fitting portion 36 is adjacent to an abutting surface 40b of the lens barrel 40, which is to be described later). Hereinafter, for convenience, the flange 32 is referred to as a large-diameter portion 35. The fitting portion 36 has a substantially cylindrical shape having a diameter smaller than that of the large-diameter portion 35 to such an extent that the fitting portion 36 does not reach the D-shaped cut flat portion 33 on the large-diameter portion 35.

The lens barrel 40 includes a cylindrical lens housing chamber 40a as illustrated in FIG. 7C. The lens housing chamber 40a includes the abutting surface 40b against which the resin lens 30 abuts. In this configuration, the lens housing chamber 40a of the lens barrel 40 and the fitting portion 36 of the resin lens 30 are of a cylindrical shape. This configuration facilitates fabrication of the lens barrel 40.

As illustrated in FIG. 7C, during assembly of the lens units 3a and 3b, the resin lens 30 is inserted into the lens housing chamber 40a until the resin lens 30 abuts against the abutting surface 40b of the lens barrel 40. During assembly of the resin lens 30 and the lens barrel 40, the fitting portion 36 of the resin lens 30 is fit into the lens housing chamber 40a of the lens barrel 40 with clearance over the entire outer circumference of the lens housing chamber 40a so as to position the resin lens 30 in the direction perpendicular to the optical axis.

To reduce or prevent deformation of the lens surface of the resin lens 30 under the above-described use environment of about −40° C. to 105° C.), the initial fitting clearance between the fitting portion 36 and the lens housing chamber 40a satisfies the following relation within the use temperature range of the stereo camera 1 to prevent press-fit between the fitting portion 36 and the lens housing chamber 40a within the use temperature range of the stereo camera 1:

Inner diameter of lens housing chamber≥outer diameter of resin lens

Satisfying such a relation allows clearance fit between the resin lens 30 and the lens barrel 40 (i.e., assembly of the resin lens 30 and the lens barrel 40 with a clearance therebetween). In a typical fixing manner, the resin lens 30 is fixed to the lens barrel 40 (i.e., the relative position between the resin lens 30 and the lens housing chamber 40a of the lens barrel 40 is fixed) by causing the outer circumference of the outer diameter of the resin lens 30 to contact the inner circumference of the inner diameter of the lens housing chamber 40a at two or more points. In at least one embodiment, a desired clearance is provided between the resin lens 30 and the lens housing chamber 40a of the lens barrel 40 over the entire outer circumference of the lens without being fixed, so as to accommodate a change in temperature. Such a state is referred to as a "clearance fit". In this configuration, a clearance is between the lens housing chamber 40a and the resin lens 30 in the direction perpendicular to the optical axis so as to reduce or prevent deformation of the lens surface within the use temperature range.

Specifically, the inner diameter of the lens housing chamber 40a and the outer diameter of the resin lens 30 satisfy formula (2) below:

$$\delta \geq \Delta T(\alpha c - \alpha l) \times D \quad (2)$$

where $\delta$ is a fitting clearance, D is an outer diameter of the resin lens 30 (a diameter of the fitting portion), $\Delta T$ is a difference in temperature between the room temperature and the upper limit of the use temperature, $\alpha c$ is the linear expansion coefficient of the lens barrel 40, and $\alpha l$ is the linear expansion coefficient of the resin lens 30.

For example, a fitting clearance $\delta$ of 28.6 mm is obtained from the formula (2) where D is 10 mm, $\Delta T$ is 80° C., $\alpha c$ is $24.3 \times 10^{-6}/°$ C., and $\alpha l$ is $60.0 + 10^{-6}/°$ C.

Since the linear expansion coefficient of a resin material used to form the resin lens 30 varies with temperature, a temperature at which the fitting clearance $\delta$ becomes minimum within the use temperature range. In the above calculation, the linear expansion coefficient was calculated at temperatures of from 20 to 105° C.

In at least embodiment, the outer diameter of the large-diameter portion 35 is set to prevent the outer periphery of the resin lens 30 from contacting the inner wall of the lens barrel 40 within the use temperature range, so as not to have an adverse effect on positioning of the resin lens 30 in the direction perpendicular to the optical axis.

As illustrated in FIG. 7C, the resin lens 30 is positioned in the optical axis direction by the pressing surface 37 of the fitting portion 36 abutting against the abutting surface 40b of the lens barrel 40. Then, the pressing member 20 comes into contact with a pressing surface 38 of the large-diameter portion 35 to transmit a pressing force to fix the resin lens 30 to the lens barrel 40. At this time, a contact surface C1 between the abutting surface 40h of the lens barrel 40 and the pressing surface 37 of the fitting portion 36 and a contact surface C2 between the pressing member 20 and the pressing surface 38 of the large-diameter portion 35 each has a shape symmetric with respect to the optical axis. This shape of the contact surfaces reduces or prevents deformation of the resin lens 30 and misalignment between axes of the resin lens 30 and the lens barrel 40 due to unevenness of the pressing force applied to the contact surfaces.

In the present embodiment, positioning the resin lens in the radial direction is achieved by fitting the fitting portion 36 of the resin lens and the lens housing chamber 40a of the lens barrel, both of which have a substantially cylindrical shape, into each other. This configuration is only one example. In some examples, the fitting portion 36 of the resin lens and the lens housing chamber 40a of the lens barrel may have a conical shape axially symmetrical to the optical axis. This configuration in which the fitting portion 36 of the resin lens 30 and the lens housing chamber 40a of the lens barrel 40 have a conical shape axially symmetrical to the optical axis facilitates the assembly of the resin lens 30 and the lens barrel 40.

Further, in the present embodiment, the large-diameter portion 35 and the fitting portion 36 are formed in a stepped shape. This is only one example. In some examples, the large-diameter portion 35 and the fitting portion 36 may form a continuous tapered shape. This configuration increases the strength of the large-diameter portion 35 and the flange 32.

Such a configuration achieves a reduction in the degree of misalignment between the axes of the resin lens 30 and the lens housing chamber 40a of the lens barrel 40 both with temperature changes and during the initial assembly of the resin lens 30 and the lens barrel 40. This also reduces the adverse effect of burrs during molding.

The following describes the advantageous effect of a reduction in the degree of misalignment between the axes of the resin lens 30 and the lens housing chamber 40a of the lens barrel 40 due to temperature changes.

With temperature changes, each component expands according to the linear expansion coefficient of its material. Different linear expansion coefficients between the resin lens 30 and the lens barrel 40 changes the fitting clearance between the resin lens 30 and the lens barrel 40. With a temperature change that further narrows the fitting clearance between the resin lens 30 and the inner wall of the lens barrel 40 after the resin lens 30 comes into contact with the inner wall of the lens barrel 40 at some temperature, the resin lens 30 is pressed against the inner wall of the lens barrel 40 by the expansion difference, which fluctuates the degree of misalignment of the axes between the resin lens 30 and the lens barrel 40. With the resin lens 30 in contact with the inner wall of the lens barrel 40 during the initial assembly, the amount of change in the degree of misalignment between the axes of the resin lens 30 and the lens barrel 40 due to temperature change becomes maximum after the assembly, the value of which is half the difference in the amount of expansion between the resin lens 30 and the lens barrel 40.

The lens units 3a and 3b that involve the accuracy typically use metallic components such as aluminum or brass for the lens barrel 40. However, the difference in linear thermal expansion coefficient between the metal component as the lens barrel 40 and the resin lens 30 is large, and the degree of misalignment between the axes of the lens barrel 40 and the resin lens 30 more likely fluctuates. Specifically, the material of the resin lens 30 has a linear expansion coefficient of about $60 \times 10^{-6}/°$ C. to $70 \times 10^{-6}/°$ C., and differs from the lens barrel 40, which is made of aluminum, by a linear expansion coefficient of about $36 \times 10^{-6}/°$ C. to $46 \times 10^{-6}/°$ C. In other words, the difference in linear expansion coefficient between the lens barrel 40 and the resin lens 30 is $20 \times 10^{-6}/°$ C. or more.

With a significant degree of misalignment between the axes of the lens barrel 40 and the resin lens 30 due to temperature changes, the position of an image significantly changes from the initial position at the initial assembly, thus possibly deteriorating the accuracy of distance measurement.

In order to reduce or prevent fluctuations in the degree of misalignment between the axes of the resin lens 30 and the lens barrel 40 due to temperature changes, the difference in linear expansion coefficient between the resin lens 30 and the lens barrel 40 is reduced or the diameter of the fitting portion 36 is reduced. For the shape of the resin lens 30 according to an embodiment, the lens diameter may be reduced. Reducing the lens diameter reduces fluctuations in the degree of misalignment between the axes.

Specifically, a typical D-shaped cut lens according to a comparative example is to have a larger outer dimension (outer circumference) of the fitting portion to accommodate the gate 34 in the outer peripheral cylinder. However, for the shape of the resin lens 30 according to an embodiment, the flat portion 33 forming the D-shaped cut is separate from the fitting portion 36, thus allowing the fitting portion 36 to have a smaller diameter than that of the flat portion 33 of the D-shaped cut portion. This configuration enables a reduction in the degree of misalignment between the axes of the resin lens 30 and the lens barrel 40 unlike the D-shaped cut configuration according to a comparative example.

In addition to the above-described adverse effect of the resin lens 30 contacting the inner wall of the lens barrel 40, different thermal expansion amounts between the lens barrel 40 and the resin lens 30 generate a sliding force along the optical axis on the abutting surface and change the degree of misalignment between the axes of the lens barrel 40 and the resin lens 30. Such an adverse effect increases as unevenness of friction due to distribution of axial force over the pressing surface increases.

In the configuration according to an embodiment, as the pressing surface has an axially symmetrical shape, the force applied to the resin lens 30 is uniform, and the fluctuations in the degree of misalignment between the axes of the resin lens 30 and the lens barrel as described above are reduced.

In addition, uniformizing the force over the contact surfaces C1 and C2 prevents nonuniform deformation of the resin lens 30 and allows a distribution of the axial force, thus advantageously reducing the amount of deformation of the resin lens 30.

Next, advantageous effects of the reduction in adverse effects of burrs during molding will be described in detail.

In the injection molding, a burr may be generated at a position of a parting line or a gas vent of a mold of the resin lens 30. When the resin lens 30 is radially fit at the outer circumference thereof, the configuration of the mold and how to handle the mold is to be considered to not generate such a burr on the outer circumference of the resin lens 30. In the configuration according to an embodiment, the fining portion 36 to be fit into the lens barrel 40 is not the outer circumference (the outer peripheral portion) of the resin lens 30. This configuration prevents the adverse effect of burrs during the molding by dividing the mold or providing a gas vent in the large-diameter portion 35, and thus facilitates the mold configuration and its handling.

Next, the advantageous effects of reducing misalignment between the axes of the resin lens 30 and the lens housing chamber 40a of the lens barrel 40 during the initial assembly will be described.

Figure 8:
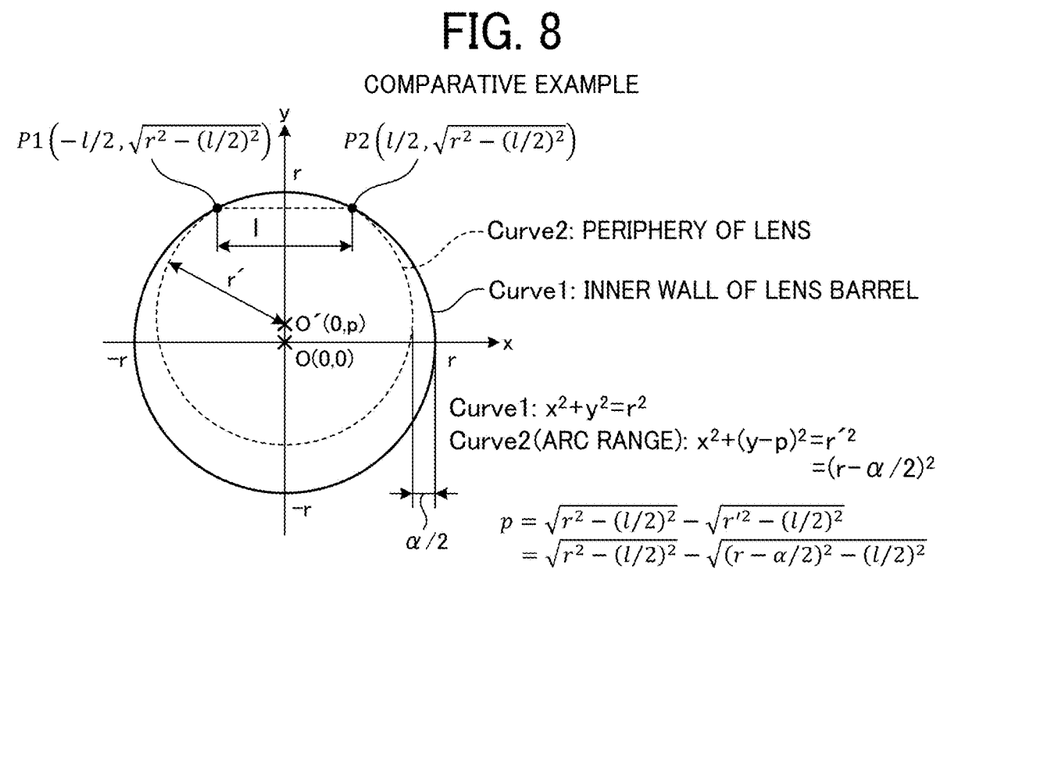
FIG. 8 is a schematic view of a configuration in which one end of the resin lens has a D-shaped cut according to a comparative example.
Figure 9:
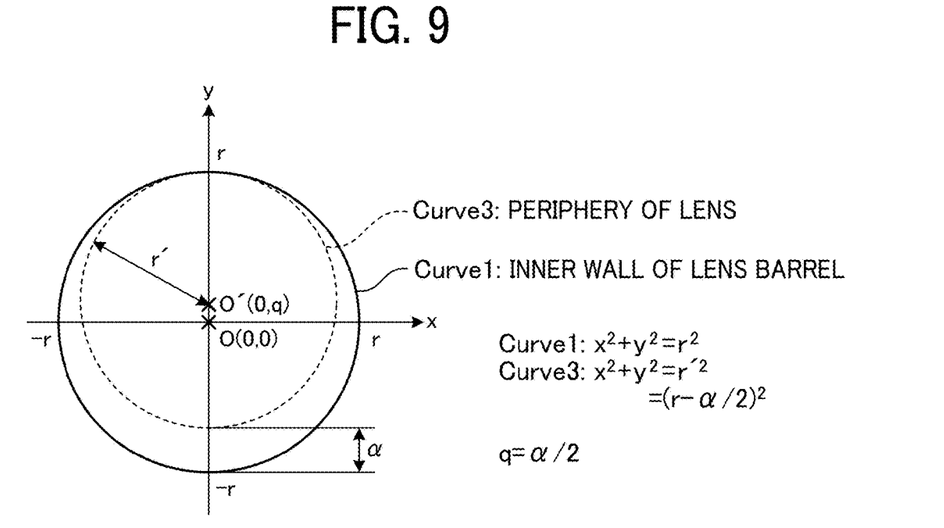
FIG. 9 is a schematic view of the resin lens having the entire periphery fit into the lens barrel with clearance therebetween, according to an embodiment of the present disclosure.

FIG. 8 is a schematic view of a configuration in which one edge of the resin lens 30 has a D-shaped cut according to a comparative example. FIG. 9 is a schematic view of the resin lens 30 having its entire periphery fit into the lens barrel 40 with clearance therebetween, according to an embodiment of the present disclosure. In FIGS. 8 and 9, curve 1 indicated by a solid line represents a lens barrel, and curve 2 and curve 3 indicated by broken lines represent outer shapes of fitting portions of the resin lens 30.

For the degree of misalignment between the axes of the lens barrel 40 and the resin lens 30 of a D-shape having a flat portion 33 during the assembly, the degree of axial misalignment becomes maximum when both edges P1 and P2 of the flat portion 33 come into contact with the inner wall of the lens barrel 40. In this case, p is obtained from formula (3) below where p is an initial maximum degree of misalignment between axes of the resin lens 30 and the lens barrel 40, r is a radius of an inner diameter of the lens barrel 40, r' is a radius of a lens outer shape of the resin lens 30, l is a D-shaped cut width, and r' is a maximum amount of a clearance between the fitting portion and the inner wall of the lens barrel 40:

$$p = \sqrt{r^2 - \left(\frac{l}{2}\right)^2} - \sqrt{r'^2 - \left(\frac{l}{2}\right)^2} \quad (3)$$
$$= \sqrt{r^2 - \left(\frac{l}{2}\right)^2} - \sqrt{\left(r - \frac{\alpha}{2}\right)^2 - \left(\frac{l}{2}\right)^2}$$

For the resin lens 30 having its entire circumstance radially fit into the lens barrel 40, the degree of axial misalignment during assembly becomes maximum when the periphery of the lens outer shape of the resin lens 30 comes into contact with the inner wall of the lens barrel 40. In this case, the maximum degree of axial misalignment q is $\alpha/2$.

For the maximum degrees of axial misalignment p and q, p is greater than q. Assuming that r is 5 mm, l is 5 mm, and $\alpha$ is 0.04 mm, the degree of axial misalignment p for the resin lens having a D-shaped cut is greater than the degree of axial misalignment q for the resin lens 30 having its entire perimeter fit into the lens barrel 40, by approximately 3 µm.

A significant degree of the initial misalignment between the axes of the lens barrel 40 and the resin lens 30 causes a deterioration in the initial optical performance. In addition, if the resin lens is closer to one end of the inner wall of the lens barrel at the initial assembly, the clearance between the resin lens and the other end of the inner wall increases, and the movable range of the resin lens also increases. This configuration possibly increases the degree of misalignment between the axes of the resin lens and the lens barrel because of an increase in displacement of the resin lens when an impact load is applied. This may also adversely affect the optical performance after the assembly.

However, the configuration according to an embodiment in which the cylindrical-fitting portion 36 of the resin lens 30 is fit into the lens barrel 40 enables a reduction in misalignment between the axes of the lens barrel 40 and the resin lens 30 more successfully than the D-shaped cut lens according to a comparative example.

As described above, in an embodiment according to this embodiment, the cylindrical-shaped fining portion 36 having a diameter smaller than that of the flange 32 is formed on the flange 32 having a part of its outer circumference (an edge of the outer peripheral portion) cut in a D-shape, on which the gate 34 is to be provided. The entire circumference, or periphery of the cylindrical-shaped fitting portion 36 is fit into the inner wall of the lens barrel 40 with clearance therebetween to position the resin lens 30 in the direction perpendicular to the optical axis. This configuration achieves a reduction in the degree of misalignment between the axes of the resin lens 300 and the lens barrel 40, which are fit into each other with clearance therebetween, during the assembly of the resin lens 300 and due to temperature changes.

Although the stereo camera 1 mounted on the automobile as the vehicle 70 has been described in the above-described embodiment, no limitation is intended thereby. Other examples of the vehicle may include a motorcycle, a bicycle, a drone, a wheelchair, and an agricultural cultivator. Further, examples of the mobile object may include a robot, in addition to the vehicle.

Further, the robot may be not only a mobile object but also an apparatus such as an industrial robot fixedly installed in factory automation (FA). The apparatus to be fixedly installed may be not only a robot but also a surveillance camera for crime prevention.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:
1. A lens unit comprising:
a resin lens including a flange forming an outer peripheral portion of the resin lens and a fitting structure having a diameter smaller than a diameter of the outer peripheral portion of the flange;
a lens barrel including a lens housing chamber and an abutting surface, the lens housing chamber housing the resin lens with the fitting structure facing the abutting surface; and
a pressing structure to press the resin lens against the abutting surface along an optical axis of the resin lens, the fitting structure being fit into the lens housing chamber over an entire circumference of the fitting structure with a fitting clearance, δ between the entire circumference and the lens housing chamber to position the resin lens in a direction perpendicular to the optical axis of the resin lens,
wherein the fitting clearance, δ, satisfies the following formula:

$$\delta \geq \Delta T(\alpha c - \alpha l) \times D$$

where D is an outer diameter of the resin lens, $\Delta T$ is a difference in temperature between a room temperature and an upper limit of a use temperature, $\alpha c$ is linear expansion coefficient of the lens barrel, and $\alpha l$ is linear expansion coefficient of the resin lens.

2. The lens unit according to claim 1,
wherein each of the lens housing chamber and the fitting structure has a cylindrical shape.

3. The lens unit according to claim 1,
wherein each of the lens housing chamber and the fitting structure has a conical shape.

4. The lens unit according to claim 1,
wherein the flange and the fitting structure form a continuous tapered shape.

5. The lens unit according to claim 1,
wherein a difference in linear expansion coefficient between the lens barrel and the resin lens is $20 \times 10^{-6}/°C$. or more.

6. The lens unit according to claim 1,
wherein the lens housing chamber and the resin lens form the clearance therebetween in the direction perpendicular to the optical axis within a use temperature range.

7. The lens unit according to claim 1,
wherein an edge of the outer peripheral portion of the resin lens is cut.

8. The lens unit according to claim 1,
wherein the fitting structure has a pressing surface contacting the abutting surface to form a contact surface between the pressing surface and the abutting surface, and the flange has a pressing surface contacting the pressing structure to form a contact surface between the pressing structure and the pressing surface,
wherein each of the contact surface and the contact surface has a shape symmetric with respect to the optical axis.

9. A stereo camera comprising:
two lens units according to claim 1 whose optical axes are parallel to each other; and
two image sensors to convert light received by the two lens units into image data.

10. A mobile object comprising:
the stereo camera according to claim 9; and
circuitry to:
 receive image data from the stereo camera;
 calculate disparity from the image data; and
 based on the disparity, control an operation of the mobile object.

* * * * *